April 12, 1949. L. ESPENSCHIED 2,467,299
HIGH-FREQUENCY TRANSMISSION SYSTEM
Filed Nov. 12, 1942 6 Sheets-Sheet 1

INVENTOR
L. ESPENSCHIED
BY
Robert J. Pluskey
ATTORNEY

April 12, 1949. L. ESPENSCHIED 2,467,299
HIGH-FREQUENCY TRANSMISSION SYSTEM
Filed Nov. 12, 1942 6 Sheets-Sheet 2
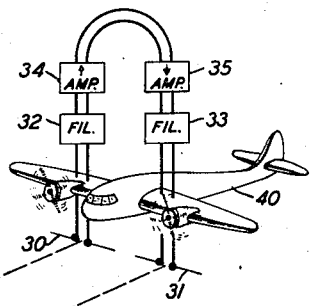
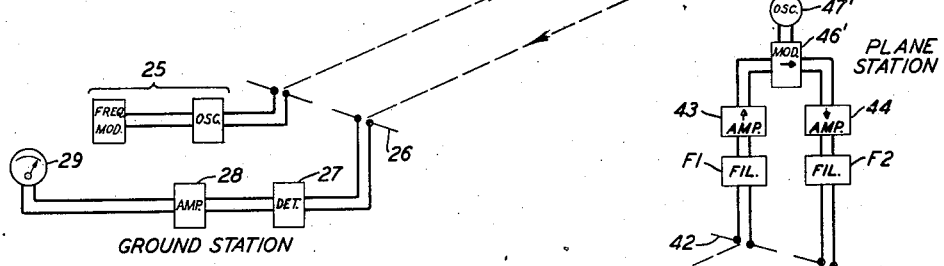
FIG. 4
FIG. 5
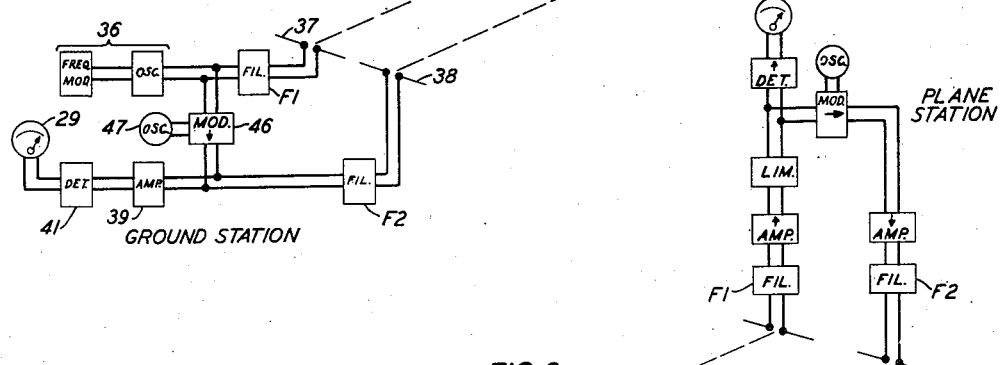
FIG. 6
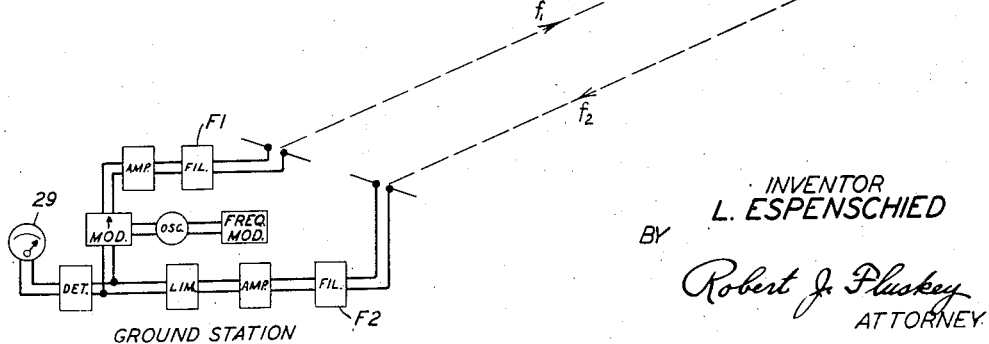
INVENTOR
L. ESPENSCHIED
BY
Robert J. Pluskey
ATTORNEY April 12, 1949.  L. ESPENSCHIED  2,467,299
HIGH-FREQUENCY TRANSMISSION SYSTEM
Filed Nov. 12, 1942  6 Sheets-Sheet 3

INVENTOR
L. ESPENSCHIED
BY
Robert J. Pluskey
ATTORNEY

April 12, 1949.  L. ESPENSCHIED  2,467,299
HIGH-FREQUENCY TRANSMISSION SYSTEM
Filed Nov. 12, 1942  6 Sheets-Sheet 4

A MOBILE STATION SINGS
WITH ONLY THE NEARER OF TWO
FIXED STATIONS

INVENTOR
L. ESPENSCHIED
BY
Robert J. Pluskey
ATTORNEY

April 12, 1949.                L. ESPENSCHIED                2,467,299
HIGH-FREQUENCY TRANSMISSION SYSTEM
Filed Nov. 12, 1942                                6 Sheets-Sheet 5
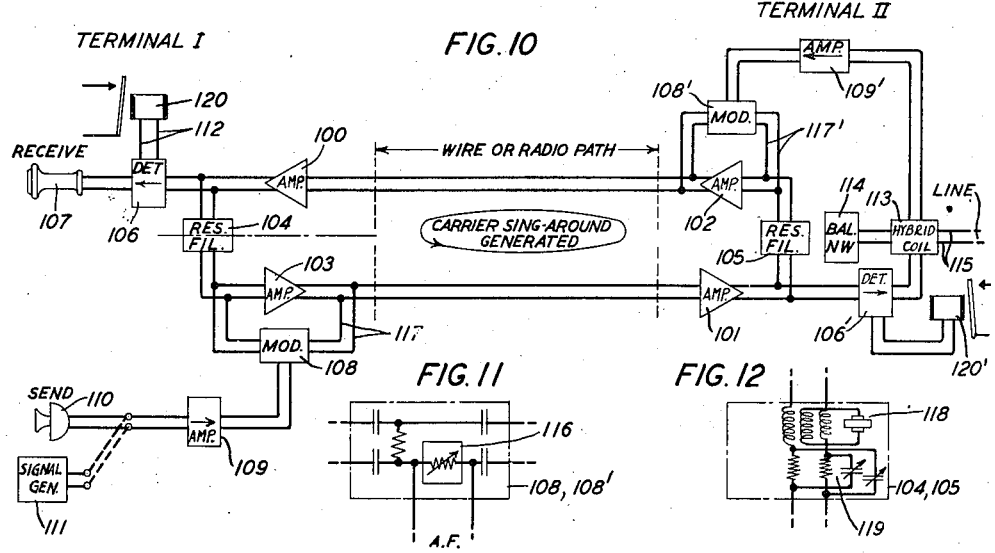
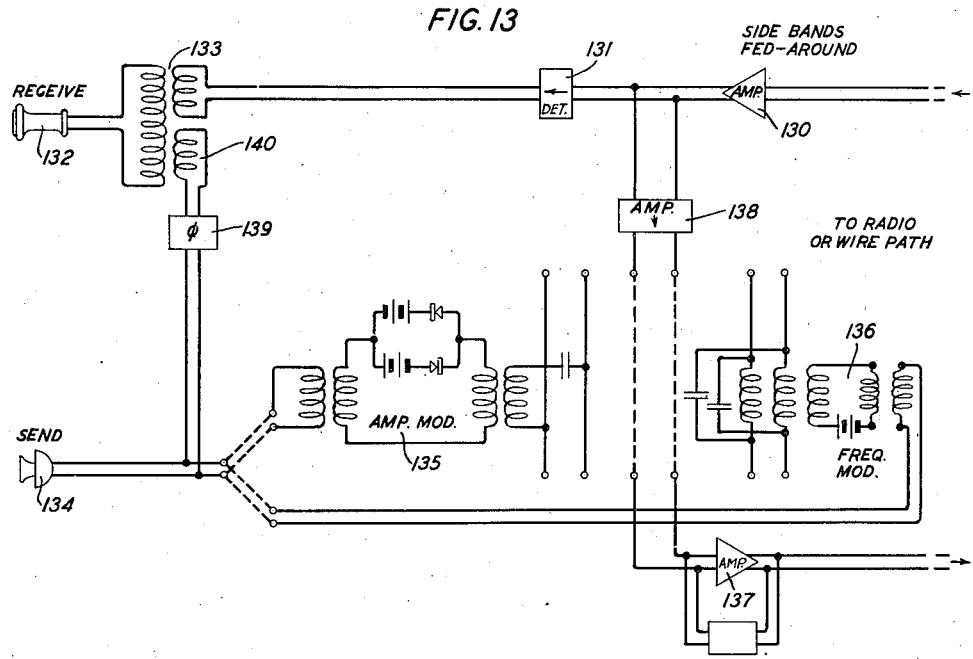
INVENTOR
L. ESPENSCHIED
BY Robert J. Pluskey
ATTORNEY April 12, 1949.    L. ESPENSCHIED    2,467,299
HIGH-FREQUENCY TRANSMISSION SYSTEM
Filed Nov. 12, 1942    6 Sheets-Sheet 6

SING-FREQUENCY AT THE HIGH TRANSMISSION FREQUENCY

SING-FREQUENCY AN INTERMEDIATE FREQUENCY
MODULATED ON THE HIGH TRANSMISSION FREQUENCY

INVENTOR
L. ESPENSCHIED
BY
Robert J. Pluskey
ATTORNEY

Patented Apr. 12, 1949

2,467,299

UNITED STATES PATENT OFFICE 2,467,299

HIGH-FREQUENCY TRANSMISSION SYSTEM

Lloyd Espenschied, Kew Gardens, N. Y., assignor to Bell Telephone Laboratories, Incorporated, New York, N. Y., a corporation of New York Application November 12, 1942, Serial No. 465,324

13 Claims. (Cl. 250—6)

This invention relates to electrical transmission systems, and, more particularly, to systems for communicating between relatively moving stations and/or for determining the location of or distance between two stations one of which is in motion.

The invention provides a new kind of system or two-way circuit, possessing novel and useful properties, for interconnecting two points electrically by means of high-frequency waves transmitted either by radio or along guides.

For ordinary two-way communication it is usual to interlink the two points concerned by means of two one-way transmissions applied either alternately, in accordance with the to-and-fro flow of the information, or simutaneously. In general, these two transmissions are either superimposed upon one frequency band and separated from each other at the terminals by balance, or else utilize separate transmission paths, as in the familiar "four-wire" type of circuit. In either event, care is taken to prevent the two transmissions from reacting upon each other at the terminals; otherwise, some kind of a round-trip or re-entry action takes place which only interferes with the normal two-way communication.

In contrast to this practice of the prior art is the type of circuit of the present invention. In accordance with it, two positively directed transmissions are established as in the ordinary case, but they are purposely made to react upon each other at the terminals, to set up a re-entrant or reflection action at both terminals. Thereby, a loop circuit is established and the feedback action around this loop circuit is the thing which is utilized to tie the two stations together and convey information between them.

In accordance with the arrangements described below, the feedback action which is utilized is a positive one whereby a high-frequency singing condition is established around the loop as between the two ends, the oscillations of which are employed to convey the information. It is conceivable, however, that there may be utilized within the general scope of the invention, a negative feedback action whereby the operation of the system is characterized by there being normally no oscillations, a species of open-circuit connection, as distinguished from the closed circuit type of connection which is effected by the positive feedback, the information being conveyed by a variation in the degree of this negative feedback or the position of it in the frequency spectrum.

The invention partakes of both of two kinds of transmissions in current use, the ordinary two-way transmission circuit such as is employed in telephony, and the two-way one-terminal type of system which depends for its operation upon waves that are sent out from one end and reflected at the other, as from a distant object, for the purpose of gleaning information from the other end. This latter is the object-locating or distance-determining type of reflecting system which has come into the radio art in the last decade or so. Reference is made to the radio altimeter patents of the present inventor, Nos. 2,045,071 and 2,045,072. And for object-locating systems, giving a gross form of vision, operating upon the principle of reflected radio waves, reference is made to co-pending application Serial No. 353,902, filed August 23, 1940, of L. Espenschied and J. G. Chaffee, and to Espenschied Patent 2,426,189 issued on application Serial No. 413,587, filed October 4, 1941.

These object-locating and distance-measuring systems are in effect one-ended, in the sense that they are energized only at one end, depending as they do for their action at the far end upon reflection from inert surfaces. In one of its forms, the circuit of the present invention is two-ended and symmetrical with respect to the two ends, whereby both reflection and energization takes place at each end, and whereby the oscillation sustaining round-trip excitation obtains. The infusion of new energy at the far end reflecting point is not feasible in cases where it is desired to detect the presence of natural objects such as the earth's surface, or where there is a definite intention not to reveal the presence of a body, as in the case of an enemy's airplane. There are other instances, however, as in civil aviation, in which it is desired that both ends of the system be known to the other wherein it is quite feasible to provide for the energization of both ends. The advantage of such energization from the standpoint of facilitating communication will be apparent from the following.

In the radio reflecting systems of the present art the returned energy, reflected from inert surfaces, can never be greater than the energy incident upon the surfaces and, in general, is considerably less. Frequently, the object to be detected is surrounded by other objects which similarly send back reflected waves, as for example, in the detection of a plane that is low on the horizon wherein reflections occur from the earth's surface, hills, buildings, etc. These other miscellaneous reflections tend only to set up confusing patterns to the observer and, in general, may be likened to the interfering effects of noise in telephone transmission. Furthermore, the wave energy which is received back at the observing point from the reflecting surfaces may well be so weak as actually to be interfered with by noises arising in the receiving antenna and vacuum tubes. With this type of system, wherein the returned transmission is obtained only from inert reflecting objects, the only way of increasing the returned energy is to increase the sending end power; this, in turn, increases all the returned energy, undesired as well as desired components.

By imparting energy within the reflecting object, as by the establishment on it of a man-made turn-around circuit possessing a large degree of amplification, the returned wave energy may be greatly increased both in absolute amount and in relation to that which is returned from the "background" reflections from inert surfaces. In other words, the particular point which we are interested in detecting or in communicating with may be made literally to shine out as compared with its background, whereby improved communication is had. This feature of imparting a very substantial "standing out" selectivity to the reflecting point may be accomplished not only by the infusion of new energy into the loop transmission at the point of reflection but may be facilitated in two other ways: By the imparting to the looped-back reflection path of frequency selectivity, and by imparting to it directional selectivity. The directional selectivity may be either in the sense of the polarization of the waves, or of the orientation of their projection, as by sharply directive antennas. By any or all of these means, an identifying characteristic is imparted to the point of reflection which distinguishes it from mere inert surfaces of reflection, and enables the particular point of communication to "stand out" electrically in reference to its surroundings.

This feature of imparting to the point of reflection by one or all of these means a high degree of effectiveness and selectance, may be practiced either at both ends of the two-way system of the present invention, or merely with respect to one end. To illustrate the latter application, take the case of an airplane flying aloft which is equipped to send and receive ultra-high frequency waves in such a way as to observe objects along the earth's surface by radio reflection—the straight object-locating reflection kind of system. One of the difficulties of use of such a system on airplanes is that there are so many reflections from the earth's surface, of about the same order of magnitude as to intensity, that it is difficult to distinguish significant things, as for example, the markers for an airport. By making certain particular things, such as the markers, so that they are energized and reflect with renewed energy, in accordance with the principle of the present invention, these points may be seen from the airplane as brilliant beacons whereby the navigation of the plane is facilitated.

In respect to two-way communication, as for telephony, the invention in its sing-around embodiment possesses several features. In the first place, it is an automatic tie-together system, in that once the two ends are properly set up they will tend automatically to tie together by a sing-around action when the two stations are within range of each other, thereby giving notification to each of the presence of the other. Thus, there is ease in setting up the connection and security as to its maintenance, in the sense of automatically locking in, and of both ends knowing it if something goes wrong, by the severance of the tie-together singing characteristic. In the second place, the sing-around condition may be utilized to measure the echo time around the path and indicate automatically at both terminals their distance apart, a feature quite useful in aerial navigation. Finally, the sing-around condition itself may be regarded as providing the carrier which interconnects the two stations, and which is modulated for effecting two-way telegraph or telephone communication.

A more complete understanding of the invention and of its further objects and features will be derived from the detailed description that follows, taken in conjunction with the appended drawings, wherein:

Fig. 1 assists in explaining the loop-singing principle involved in the invention;

Figs. 4, 5 and 6 illustrate high frequency systems for determining the distance between a fixed point or station and a moving point or station, specifically the distance of an aircraft from a landing field or airport, utilizing the sing-around principle of the invention in different aspects;

Figs. 10 to 15 illustrate the application of the loop-singing principle to two-way telephony at ultra-high frequencies.

Figure 1:
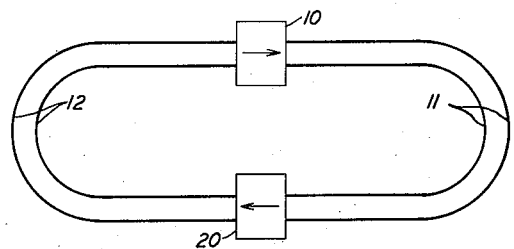

The general principle embodied in the invention will be understood by reference to Fig. 1. This figure shows generally a plurality of high frequency stations 10, 20. Each of the stations is adapted to transmit and to receive a high frequency wave. They are interconnected over suitable transmission paths 11, 12, for example, transmission lines or any suitable transmission media, for example, free space, the transmission paths being of appreciable length, that is, the stations may be separated many miles apart. The wave transmitted by station 10, for example, is received at station 20, amplified and transmitted. The amplified, retransmitted wave is received by station 10, and retransmitted with or without further amplification. If the amplification around the loop constituting the stations and the transmission paths is made sufficiently great, a singing or loop oscillation condition will be established. The frequency or frequencies at which the system will sing will be a function of the absolute frequency and band width of transmission that the system affords, and of the electrical length of the system in terms of the standing waves that can be set up in it. If the system were arranged so that the stations were movable relative to each other, whereby the length of the transmission paths therebetween could be varied, and so that the band width extended to higher frequencies, the system would comprehend additional frequencies, frequencies for which the phase relations around the loop are favorable for oscillation interspersed with frequencies at which the returned wave is in phase opposition to the initial wave.

Figure 2:
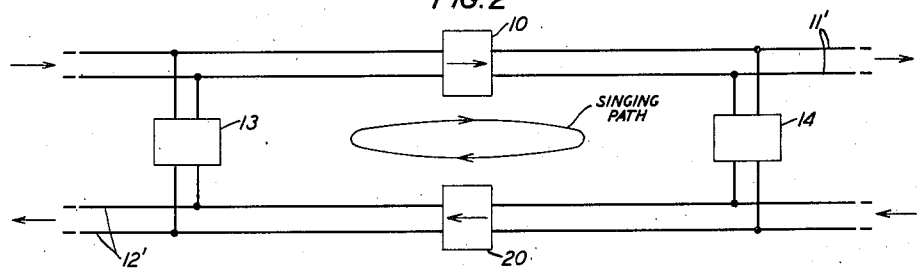
Fig. 2 illustrates a four-wire, two-way transmission system using the loop-singing principle.

Fig. 2 illustrates how the transmission paths interconnecting the stations 10, 20 may be broken to provide two one-way wire transmission circuits 11', 12' which may be used for carrier wave transmission. The carrier waves may be provided by one or more of the sing-around frequencies. The networks 13, 14, interconnecting the two circuits 11', 12' and closing the singing loop, pass these carrier waves around the loop but exclude the actual signaling channels, namely, the side-bands of modulation.

Figure 3:
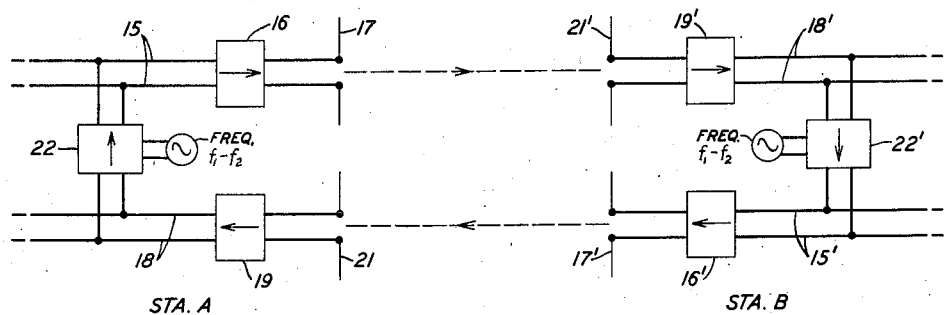
Fig. 3 illustrates a high frequency system using the loop-singing principle, in which the terminals or stations are linked over an electromagnetic or radio wave path or medium and in which the stations may be relatively movable.

Fig. 3 illustrates how the principle may be applied in the radio or higher frequency field. The two stations A, B are intended for operation at ultra-high frequencies, for example, some hundreds or thousands of megacycles. Each station comprises a transmitting circuit 15, 15' comprising a transmitter 16, 16' and a high frequency radiator or antenna 17, 17', a receiving circuit 18, 18' comprising a receiver 19, 19' and a high frequency receptor or antenna 21, 21', and a frequency translating modulator 22, 22'. The two one-way channels, that is, between circuits 15 and 18' and between circuits 15' and 18, are on two different frequencies but in the same general frequency range. Each channel is translated to the frequency of the other by means of the modulators 22, 22', so that there is a continuous transmission path around the loop comprising the receivers, transmitters, antennae, modulators and the space paths, for the carrier wave that is to be generated by the singing action. The first mode or lowest frequency of oscillation will be that corresponding to a full wave-length around the loop. If the loop length is of the order of 18.6 miles, and the velocity of propagation around the loop is assumed to be that of light, that is, 186,000 miles per second, the transit time around the loop would be $$\frac{18.6}{186,000} = .0001 \text{ second}$$

In terms of frequency, this would be 10,000 cycles per second. Singing, or a tendency to sing, will occur at this the fundamental frequency of natural oscillation and also, at multiples of this frequency since the returned waves would be in phase.

Let it be assumed that the spacing between the stations is changed, for example, one of the stations is mounted on a truck, aircraft or other vehicle or movable body. Movement of the latter with respect to the fixed or immobile station would change the value of the lowest sing-around frequency and, in turn, the entire series of harmonics with increasing distance bringing the fundamental frequency lower and the harmonics closer together, and vice versa. The fact that the singing frequency is proportional to the distance between the two stations makes it possible to measure the distance in terms of the frequency. One application of this might be the following: Assume that an aircraft is traveling along an air route along which are uniformly spaced a plurality of stations (see Fig. 16, described in detail hereinafter), each constituting an immobile station linked or linkable in succession with a single station carried by the aircraft over a sing-around path such as has been described. There could be continually indicated at the successive ground stations and on the aircraft, the instant-to-instant distance of the aircraft from a given ground station, and the aircraft, throughout its route, would be tied to a ground station by a transmission channel available for instant communication.

If one takes the radio altimeter and turns it around, sending waves upward from the earth's surface for the purpose of detecting the presence of airplanes and of measuring the distances to them, a serious limitation immediately arises. The energy reflected back to a particular point from a distant plane is an extremely small fraction of the initial energy because of losses in the outward transmission, in the absorption and dispersion in the actual reflecting surfaces of the plane, and in the return transmission path. The small amount of energy that is received back is generally so weak for any considerable distances that it tends to be overwhelmed by electrical noises in the transmitting medium, and by incidental reflections from other objects in the environment of the ground station.

One way of coping with this energy limitation problem is that of concentrating the available power, both as to transmission and as to reception in the desired direction, by means of high terminal directivity. The obtaining of gains of the order of 30 decibels for both transmitting and receiving becomes feasible in this way without prohibitive sizes of antennae for waves only a few centimeters long, but such sharp directivity itself brings about difficulty of training the beam on or from a rapidly moving airplane with the necessary accuracy and of picking up connections as airplanes come into an airport from different directions.

In view of these facts, for purposes of civil aviation it is proposed to go to the plane end of the system and to effect an improvement in the conditions of reflection at that terminal. Thus, the object is to effect a more powerful and selective kind of reflection from the plane than is normally obtained from its inert surfaces. There is included in the plane reflecting terminal amplification and frequency selectivity and there may be included also a degree of directivity provided, for example, by reflectors or horns. Arrangements for obtaining a more controlled reflection from the planes in this way are illustrated in Figs. 4, 5 and 6.

Fig. 4 shows, at the left, the ground station or terminal. This station comprises a frequency modulated transmitting oscillator 25 such as is employed in a known type of altimeter, such as is disclosed, for example, in "A terrain clearance indicator" volume 18 (1939), Bell System Technical Journal, pp. 222–234, by L. Espenschied and R. C. Newhouse. In close proximity to the transmitting portion of the station is the receiving portion thereof comprising an antenna 26, detector 27, an amplifier 28 and suitable indicating means 29. The receiving circuit not only picks up radiant energy originating in the plane 40, but also a preassigned proportion of the radiant energy projected from the transmitting antenna at the ground station. The airplane terminal or station at the upper right comprises a receiving antenna 30 and a transmitting antenna 31 coupled together through filters 32, 33 selective to the frequency or frequencies employed and a plurality of amplifiers 34, 35 for increasing the amplitude of the received signal before retransmission. The circuit on the airplane, therefore, comprises a radio or high frequency "active," that is, reinforcing or amplifying, reflecting loop. In this particular system, the frequencies employed for transmission and retransmission around the system may be the same, or may occur in the same frequency range. The amount of amplification that can be included in the loop on the plane may necessarily be limited to the degree of directional selectance and/or balance that can be realized between the two antennae on the aircraft. Under ordinary conditions this discrimination, obtained by shielding between the two antennae and balancing, might be of the order of 40 decibels. Such an amplification may at least overcome the fact that the wave aperture of the antenna on the plane is much smaller than that of the whole surface of the plane when the reflection from the plane is not reinforced, that is, when the plane does not include the high frequency reflecting loop.

The system of Fig. 5 enables much more amplification to be realized. Transmission in the two directions, that is, from the ground station to the plane and from the plane station to the ground station, occurs in different frequency bands. The transmitting circuit at the ground station comprises frequency modulated oscillator means 36, a filter F1 for the frequency band transmitted from the ground station, and a transmitting antenna 37. The receiving circuit at the ground station comprises a receiving antenna, a filter F2 for passing the frequency band transmitted from the plane, an amplifier 39, a detector 41 and suitable indicating means 29. The receiving circuit at the plane comprises a receiving antenna 42, a filter F1 selective to the frequency band transmitted from the ground station and an amplifier 43. The transmitting circuit at the plane station comprises an amplifier 44, a filter F2 selective to the frequency band employed in transmission from the plane, and a transmitting antenna 45. The band width of each filter is made wide enough to accept the frequency sweep of the frequency modulation. At both the ground station and the plane station the transmitting and receiving circuits, which are in different frequency bands and which do not react upon each other, are interconnected by modulators 46, 46' and oscillators 47, 47' so that the transmission in the two bands may be suitably matched in frequency range and the interfering beat note established. Modulator 46 is directed to transmit from the transmitting to the receiving leg, whereby there is supplied to the receiver for beat-making purposes, some of the transmitting oscillator current translated by the frequency interval that exists between the two channels. It would appear that the two offset frequencies, that is, on the plane and on the ground, need not be identical and that any small frequency difference that does exist between them will simply show up as an error in the beat frequency and, in terms of the distance indication, that this error can be held to such small values as to be negligible.

The arrangement of Fig. 5 would provide at the ground station an indication of the distance separating the ground station and the plane. In order that the pilot in the plane also should have the benefit of the distance indication, a second such system working in a reverse sense could be employed, or the indication obtained at the ground station could be transmitted back to the plane on a separate radio channel. The circuit arrangement of Fig. 6, however, shows a more direct arrangement for accomplishing simultaneous distance indications at the fixed or ground station and the movable or airplane station. In this arrangement, the ground station receiving circuit is connected to the transmitting circuit through a modulator, the oscillator of which is frequency modulated. At the plane station, the transmitting and the receiving circuits are interconnected by the frequency displacing oscillator-modulator circuit. At both the ground and the plane stations, the receiving circuits are terminated in a detector and a distance indicating meter. With this arrangement the interfering beat frequency takes the form of the natural sing-around frequency around the entire transmission loop modified by the rate of frequency modulation at the ground station. That is, the circuit will tend to sing around the loop at a frequency determined by the natural period of it, or rather the harmonics of this natural period beating with each other, the resulting beat frequency being then a direct function of the distance separating the plane station from the ground station. This sing-around frequency is interrupted periodically at the rate at which the frequency modulating oscillator is swept over its frequency range. By thus sweeping the ground terminal over a range of frequencies sufficient to comprehend a plurality of the harmonics of the sing-around frequency, the generation of natural oscillations by the system is insured. Thus the action of the frequency-modulated modulator at the ground station may be conceived as one of "sawing" the ground station turn-around terminal across the interference spectrum of the system, as will be better visualized in connection with Fig. 7, whereby the sing-around frequency is started and stopped, or modulated, or shifted, at the rate at which the frequency sweep recurs. This is a constant factor for which allowance is made in calibrating the indicating instruments at each end in terms of distance, so that it cancels out in the final result. By thus having the ground terminal feed back to the plane energy received from it and setting up a round-trip loop, the plane as well as the ground station can detect the sing frequency and give a continual indication of the distance separating the two stations.

Figure 7:
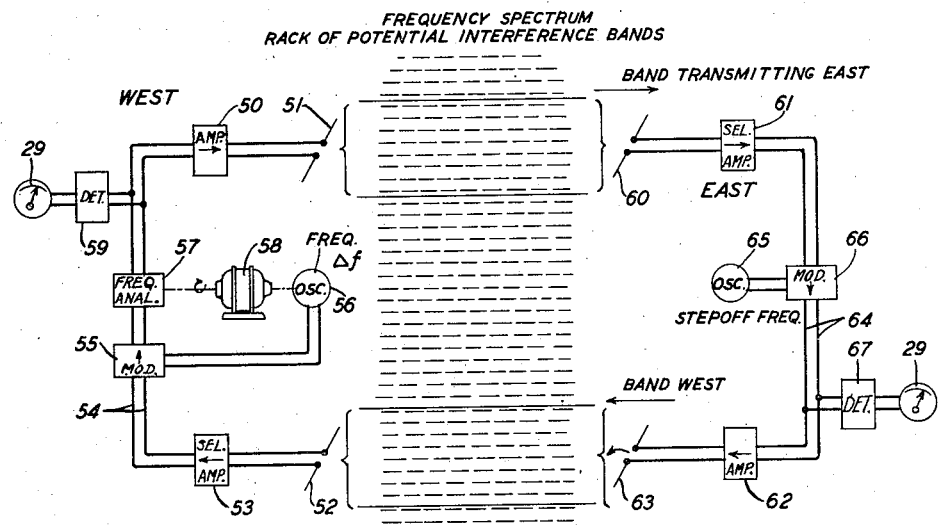
Figs. 7, 8 and 9 illustrate ultra-high frequency systems for determining the distance between relatively moving points or stations, utilizing the sing-around principle of the invention.
Figure 8:
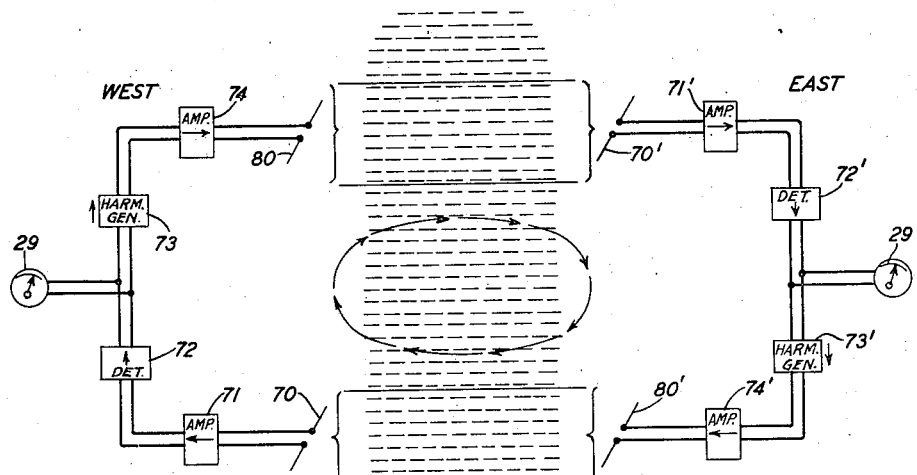

Figs. 7 and 8 show more specific arrangements constituting extensions of the principles involved in the arrangement of Figs. 4, 5 and 6. In the arrangement of Fig. 7, the west point or station comprises a transmitting circuit including a wide band ultra-high frequency amplifier 50 and a radiating antenna 51, and a receiving circuit including a receiving antenna 52, a wide band ultra-high frequency receiving amplifier 53, a cross-connecting circuit 54 connecting the transmitting and the receiving circuits and including a modulator 55, an oscillator 56 and a frequency analyzing circuit 57, the oscillator and the frequency analyzing circuit being under the control of a motor 58. The west station also includes a detecting circuit 59 and an indicating device 29. The east point or east station of the system comprises a receiving circuit including a receiving antenna 60, a wide band ultra-high frequency receiving amplifier 61, a transmitting circuit including a wide band ultra-high frequency transmitting amplifier 62 and transmitting antenna 63, and a wide band cross-connecting circuit 64 joining the receiving and transmitting circuits and including an oscillator 65 and modulator 66, and an indicating circuit including a detector 67 and a distance indicator or meter 29. In any such system as is contemplated here, in view of the finite time of propagation around the loop for any one distance separation between the west and the east stations, there will be a certain series of frequencies for which the fed back or retransmitted signal or impulses will add in phase to the incident impulses tending thereby to set up the singing condition at these particular frequencies and a certain other succession of frequencies intermediate with respect to the first series for which the returned impulses will be out of phase, that is, a set of frequencies stabilized against singing. The alternating between these two sets of conditions successively throughout the band gives rise to an interference spectrum similar to that encountered in monochromatic light known as Fresnel rings.

This condition, that is, of there being a rack or ladder of interference bands and, conversely, a whole succession of bands at which singing will tend to take place around the circuit, has been illustrated in Fig. 7. There is available in such a system a wide succession of discrete frequencies potentially available for use as singing channels. The frequency interval between them is defined in terms of the finite time of propagation around the loop, which may be taken as being that of light waves, and the actual distance around the loop. It is only necessary therefore to isolate or to select suitable portions of this wide frequency spectrum, and apply appropriate amplification to set up a singing condition on the selected channels.

In the arrangement of Fig. 7, this is accomplished in the following way. The transmitting amplifier at the west station and the receiving amplifier at the east station define the limits of the band transmitted. If it is assumed that the band is 10 megacycles wide, and is located in the absolute frequency scale at 300 megacycles, so that it extends from 300 to 310 megacycles, and that the transmitting amplifier and the receiving amplifier at the east and west stations for transmission from east to west also define a band 10 megacycles wide but located in the absolute frequency scale at 200 megacycles, so that the band extends between 200 and 210 megacycles, a basis for operation is provided.

At each station the receiving circuit and the transmitting circuit thereof are interconnected, as illustrated, through a modulator, the function of which is to translate the frequency of one of these wide band positions to the other. These modulators have supplied to them a beating frequency representing the difference between these two band positions or, in the assumed case, 100 megacycles. Connected to the output of the cross-connecting modulator at the west station is the frequency analyzing circuit. This circuit should be sufficiently sharply tuned to resolve out from the frequency spectrum just one of the interference bands that have been indicated. The frequency analyzer is, in effect, run up and down the frequency scale continuously by the motor. An alternative arrangement would be that the frequency analyzer circuit remain constant and the motor be caused to frequency modulate the oscillator providing the frequency for beating with the input wave to the modulator, which would then have the effect of moving the modulator output band up and down across the fixed frequency analyzer circuit. In effect, the round trip singing condition is swung back and forth across the interference bands that are potentially present in the total band width transmitted around the system.

This would result in the system alternately starting and stopping the singing condition. In other words, the singing carrier frequency around the loop would be modulated at a lower frequency rate. It is the value of this lower frequency rate, corresponding to the rate of swinging across the interference spectrum, that is measured by the indicating devices and that is used for measuring the distance separating the west and the east stations. The value of this lower frequency depends upon the rate at which the motor causes the frequency modulation and, secondly, the frequency spacing of the interference bands. The motor introduces a constant factor. The frequency spacing is the controlling factor which is utilized. For any one system set up, it is dependent directly and solely upon the length around the loop or the distance between the two ends.

To illustrate the operation of the system, specific figures may be taken. Assume that the distance around the loop is 30 kilometers or about 9 miles between the two stations. This might represent, in a particular instance, the distance of an airplane from the airport. Since radio waves travel at the rate of about 300,000 kilometers per second, the time it will take an impulse to traverse the loop will be $30/300,000$ or .0001 of a second. This means that the natural period around the loop, that is, at which the loop will tend to sing, is 10,000 cycles per second. It is also true that for all the harmonics of this fundamental frequency, the phases will be such as to tend to support singing. It is in this sense that one may premise the existence of a whole rack or ladder of potential singing frequencies extending throughout the high frequency range.

The frequency band width of the loop taken as a whole is actually narrowed down to just one of the interference bands by the frequency analyzer. Let it be assumed that this frequency analyzer is continually being swept across the entire band width of the transmitting channel of 10 megacycles, for example, some twenty times per second. The band width of 10 megacycles therefore will be potentially 10 megacycles divided by 10 kilocycles, or 1,000 interference bands. If they are swept across back and forth twenty times per second, this would mean that the actual singing of the system will be started and stopped at the rate of 1,000 times 2 times 20 or 40,000 cycles per second. The latter, then, would be the frequency which would be indicated by the indicating devices at the west and the east stations. At both stations, therefore, the separation between them is known.

If it is now assumed that at a particular instant the west and the east stations are separated by a smaller distance, for example, .93 mile, or, from a loop standpoint, 3 kilometers, the time required for round trip travel around the loop would be $3/300,000$ or .00001 of a second. The frequency interval therefore between the interference bands is at the rate of 100,000 times per second. In the total wide band channel interval of 10 megacycles, there would then be one hundred of the interference bands for the assumed short distance. As these are intercepted at the rate of twenty per second, the frequency generated is 20 times 2 times 100 or 4,000 cycles per second. Obviously, the frequency generated in this manner is strictly proportional to the distance, and, for any fixed condition as to the frequency sweep, the frequency measuring circuit and indicating device can be calibrated directly in terms of distance.

The system illustrated in Fig. 8 is somewhat similar but operates on the basis of free-singing around the loop, the frequency level at each terminal coming down to that of the fundamental sing-around frequency. That is, at each station there is a circuit connected between a receiving antenna 70, 70′ and a transmitting antenna 80, 80′ that includes a wide band ultra-high frequency receiving amplifier 71, 71′, a detector 72, 72′ for detecting the received waves down to a relatively low frequency, a harmonic producer 73, 73′ for generating the transmitting frequency, and a wide band ultra-high frequency transmitting amplifier 74, 74′. A distance indicating device or meter 29 is connected in the described circuit between the output of the detector and the input of the harmonic producer.

With the arrangement of Fig. 8, the frequency is measured directly in terms of the frequency interval of the harmonics of the fundamental sing-around frequency of the system. The west and the east stations transmit on two wide ultra-high frequency bands, which may be those instanced for the system of Fig. 7, and the operation may be described as follows. The system may be conceived as arriving at its singing condition in the following manner: The receiver at each of the stations receives a certain noise agitation throughout its band. Because of the feedback nature of the system, such agitation is reinforced at those frequencies which represent the in-phase condition around the loop. If it is assumed that the interference band interval is of the order of 10,000 cycles per second, the energy tends to mount up at the 10,000 cycle interval. In the output of the detector, therefore, in each of the receiving circuits, energy tends to accumulate at a frequency of 10,000 cycles per second. Similarly, the energy which is furnished to the transmitting amplifier from the harmonic producer tends to be multiples of this frequency. As the positive feedback action around the loop continues, the energy built up develops into a steady state condition of singing.

Actually, the frequency of 10,000 cycles per second is present as such only at each end of the system between the detector and the harmonic producer at each station, and it is at this point, therefore, that the indicating meter is inserted in the station circuit. In the remainder of the system, the singing condition is represented by a plurality of components of very high frequency lying within the transmission band of the two stations. It is the beating together in the detectors of these very high frequency components lying at intervals of 10,000 cycles which gives the detected sing-around frequency that is measured. The transmission band in each direction is so wide that it is substantially flat for frequency ranges that are wide compared with the frequency interval of the interference band. The system, therefore, always sets up singing energy on two or more of the interference channels, whereby detection of the frequency interval between them becomes possible. With this system, it is apparent, it is possible to obtain an indication at each of the stations involved of the distance between them.

Figure 9:
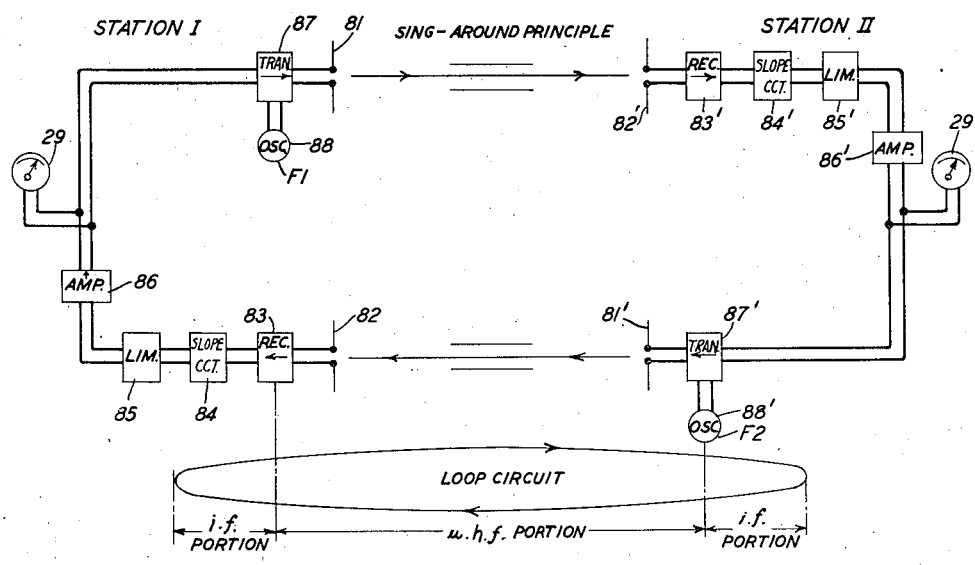

Instead of having the interference band components beat with one another and thereby indicate the frequency interval between them, another arrangement would be to provide two carrier waves in the ultra-high frequency range, one transmitting from east to west and the other transmitting from west to east, with a suitable arrangement such that the natural frequency around the loop is transmitted as a modulation of these two carrier waves. In this way, the energy actuating the round trip or loop transmission is made independent of the singing condition, and the singing condition that is actually utilized is that of the fundamental period of the loop which ordinarily is likely to be the most pronounced in its singing action. Such an arrangement also has the advantage of reducing the width of the frequency spectrum required for operation. Fig. 9 illustrates this embodiment of the invention.

The system of Fig. 9 comprises two stations, I and II. Station I may be located at a fixed point for example on the ground, and station II may be located on a moving or movable object, for example, an aircraft. At each of the stations, a transmitting antenna 81, 81′ and a receiving antenna 82, 82′ are provided. At each station the antennae are interconnected by a circuit comprising a radio receiver 83, 83′, a slope circuit 84, 84′, an amplitude limiter circuit 85, 85′, a low frequency amplifier 86, 86′, and a radio transmitter 87, 87′ having a source 88, 88′ of carrier wave associated therewith. Connected across the circuit between the low frequency amplifier and the amplifying-modulating radio transmitter is a suitable meter or other indicating device 29. The transmission from station I may be on a carrier wave F1, and transmission from station II may be on a second carrier wave F2. In operation, station I sends out a modulated ultra-high frequency wave F1. This wave is received at station II, is detected and the detected output is applied to the signal input side of the transmitting circuit at station II. Station II sends out a modulated ultra-high frequency wave F2, which is received at the station I, detected and applied to the input side of the transmitting circuit at the ground station. The system accommodates a signal transmission band superimposed (modulated) upon the carrier waves wide enough to take the highest of the possible sing-around frequencies, which would be that corresponding to the shortest distance between the stations for which the system is to operate. For example, if this minimum distance is taken as 1.5 kilometers and the maximum distance as 150 kilometers, the range of the fundamental sing-around frequency would lie between 100 kilocycles and 1 kilocycle per second. It is this band of 100 kilocycles that would be superimposed on the ultra-high frequency carrier wave. The amplitude limiters are provided at the two stations to insure that the relatively low frequency sing-around frequencies do not overload the higher frequency transmitting circuits and receivers. The receivers would be provided with automatic gain control, and the entire system designed to maintain a uniform amplitude level of singing for the entire range of distances for which the system is intended to operate. The slope circuits at the two stations are provided for sloping the transmission characteristic of the band in which the singing is to take place, sloping it in the direction of increased attenuation for increased frequency throughout the band. This slope, of course, can be the side of a resonance curve, either that of the tuning characteristic of the receiving circuit or of the resonance circuit 84, 84′ introduced in the low frequency side of the receiving circuit especially for this purpose. The slope circuit would favor the lower frequencies involved in the singing condition, to insure that it will always be the low or fundamental singing frequency for any given distance at which the system will sing.

The principle of this invention may be applied also to two-way telephony, that is, the natural sing-around frequency of the regenerative path can establish the carrier frequency on which the modulations are impressed. In practice, this may be realized by a continuous-sing method, wherein the oscillations are supported by suitable amplifiers at the terminals, or by the use of discontinuous pulses or groups of high frequency waves, the pulse period bearing an integral relation to the natural period around the circuit. In the latter case the terminal amplification would be introduced by the triggering action of the pulses arriving at one terminal from the other. Although the following description is with specific reference to the first-mentioned method, aspects having their counterpart in a pulse type system will be evident to those skilled in the art.

There are at least two general ways in which two-way carrier telephony may be realized in a two-terminal system involving a sing-around condition between the terminals. One would be to modulate the sing-around frequency or carrier wave at any convenient point in the circuit, varying its amplitude in accordance with audio frequencies by subjecting the circuit to such audio frequency variations in respect to attenuation, or gain, or both. This would mean that the modulation variations of the carrier waves, that is, the side bands would be transmitted around the entire loop, and the modulation would be received back as a strong side tone or echo. The other procedure would be so to modulate the loop-generated carrier wave at one end or terminal that the modulation side bands are transmitted to the other terminal and there detected without being retransmitted to the originating terminal. The carrier wave in the reverse direction would be free, therefore, to be independently modulated. So far as the telephone transmission is concerned, this would be analogous to transmission possibilities in a true "four-wire" circuit. Fig. 10 illustrates a system such as has been discussed.

In Fig. 10, the oscillation or sing-around loop comprises receiving amplifiers 100, 101, transmitting amplifiers 102, 103 and sharply tuned adjustable phase shifting networks 104, 105. Although the amplifiers 100, 102 and the amplifiers 101, 103 are shown interconnected by a wire path, it is evident that such interconnection may be over guiding or radio wave path or medium. In addition to the amplifiers 100, 103 and the network 104, terminal I comprises a demodulator or detector circuit 106, a sound wave reproducer or telephone receiver 107, a modulator 108, an audio frequency amplifier 109, a sound wave pick-up device or microphone 110, a signal generator 111 and a station signal circuit 112. In addition to the amplifiers 101, 102 and network 105, terminal II comprises a hybrid coil 113 and balancing network 114 for coupling terminal II to an audio frequency telephone line 115, a demodulator or detector circuit 106', a modulator 108' and an audio frequency amplifier 109'.

The modulators 108, 108' may be such as is illustrated in Fig. 11 including a high speed thermistor 116, variable in resistance in response to the amplified audio frequency input thereto from the microphone 110 and amplifier 109 or amplifier 109'. The modulators are connected in the feedback circuit 117, 117' of the amplifiers, modulation being effected by variation in the amplification of the amplifiers in response to thermistor resistance variations.

The networks 104, 105 interconnect the oppositely directed transmission paths. These networks isolate the side bands being transmitted in opposite directions but pass the sing-around frequency or carrier wave. Fig. 12 illustrates the character each of these networks may take. The circuit comprises an extremely sharply tuned quartz crystal 118 connected in effect in series in the loop circuit such as to present a very low impedance at the sing-around frequency and a sharply or rapidly rising impedance beginning at a few tens of cycles at each side of the carrier wave. This quartz crystal oscillator or resonator may be accurately adjusted to the natural frequency of the loop circuit by the adjustable phase shifting means 119.

The relay 120 or the relay 120' associated with the detector circuit at the terminals of the system of Fig. 10 remains energized so long as the loop singing condition exists. When the sing-around frequency or carrier wave is interrupted or modulated by suitable signals originating at the terminal I (for example at the signal generator 111), or at the distant end of line 115, the contact set associated with the relay will operate to transmit the signal to a suitable visual or audible indicator (not shown).

Fig. 13 shows the audio frequency terminal of a sing-around carrier wave telephone system in which the side bands for either direction of transmission are permitted to traverse the entire loop. The receiving path is through the receiving amplifier 130, the detector or demodulator circuit 131, and the audio frequency transducer or telephone receiver 132 and receiver transformer 133. The sending or transmitting path from the terminal is from the microphone 134, through the amplitude modulating circuit 135 and the frequency modulating circuit 136 and the transmitting amplifier 137. One or the other of these modulators is connected in the high-frequency sing-around circuit, between the amplifier 138 and the amplifier 137, by means of the switch arrangement indicated. The receiving and transmitting paths are interconnected by the amplifier 138. To minimize sidetone in the receiver during transmission, the phase shifting network 139 and balancing winding 140 are connected between the receiver and the microphone. The particular amplitude modulator circuit 135, shown by way of illustration, takes the form of a pair of high speed limiters to limit the normal amplitude of the sing-around carrier wave to a value beneath the overload point of the amplifiers of the sing-around path. This is accomplished by choice of the direct current biasing voltages. The instantaneous value of this bias is varied by the superimposed voice frequencies generated at the microphone 134. That is, the level at which the system sings is varied from instant to instant at the voice frequency rate, whereby the singing-generated carrier wave is modulated in an amplitude sense. To use the amplitude modulating circuit 135 in this way, it is connected across the circuit which extends from the output of amplifier 138 to the input of amplifier 137, by means of the switches shown.

In cases where it is desired to employ frequency modulation in the system, the frequency modulating circuit 136 may be connected between the microphone 134 and the output terminals of amplifier 138 and the input terminals of amplifier 137. The circuit 136 is shown by way of illustration. It is essentially a phase shifting circuit, the reactance of which is varied in accordance with the audio frequencies. In the particular circuit, it is only the inductance that is controlled, by a variation in the saturation of its iron core coils shown to the left of the numeral 136, but obviously the capacity could be varied, or both the inductance and the capacity varied. In either event, the frequency of oscillations in the singing loop is varied over a range that is proportional to the audio frequency amplitude variation and at a rate from instant-to-instant proportional to the instantaneous amplitudes of the audio frequencies themselves.

The detecting circuit 131 would be arranged for the demodulation or detection of either amplitude or frequency modulated waves depending upon the type of modulation employed in the system. The amplifier 137 may be of a negative feedback type and may be provided with a slow automatic gain control whereby a constant transmission equivalent is maintained around the loop path.

Figure 14:
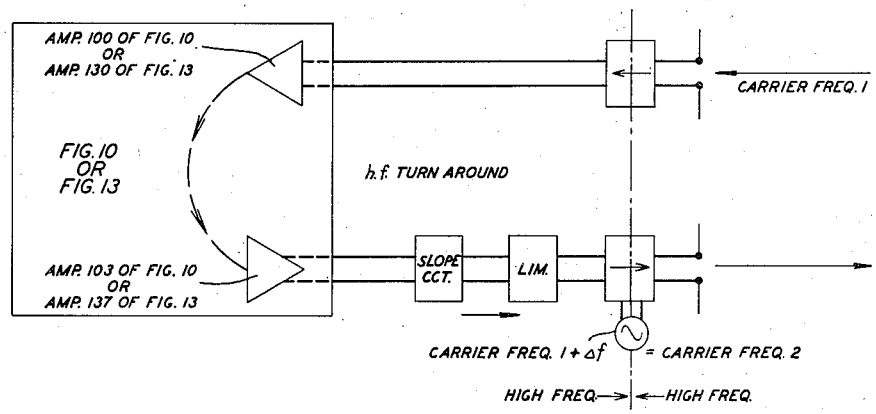
Figure 15:
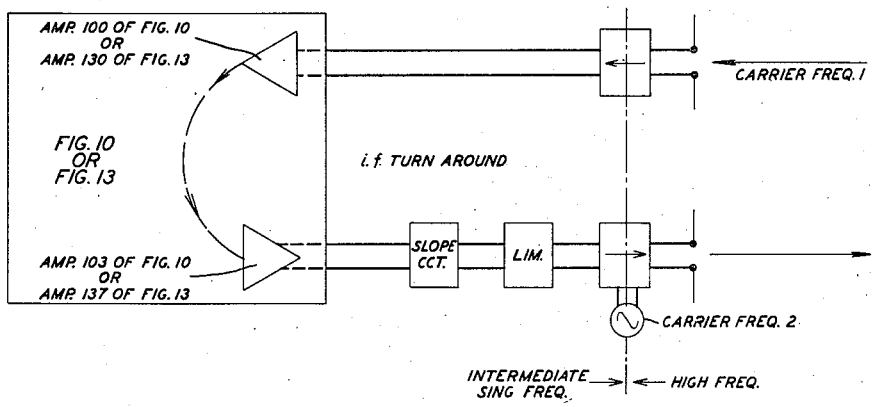

Figs. 14 and 15 illustrate how the audio frequency terminals of Figs. 10 and 13 may be associated with an ultra-high frequency radio link, that is, one involving frequencies of the order of several hundreds or thousands of megacycles.

In Figs. 14 and 15, the ultra-high frequency radio transmission in the two directions, that is, into the terminal or station and away from the terminal or station, is illustrated as occurring at different frequencies for the purpose of getting quite complete separation between the oppositely directed channels of transmission, that is, for obtaining equivalent "four-wire" transmission through the radio medium. It is physically possible, of course, to transmit in the two directions at the same frequency, obtaining the separation at the terminals by high degree of directional discrimination, meaning by this the use of sharply directive antennae, of polarization of the waves perpendicular to each other in the two directions of transmission, and the use of high frequency balancing adjustments at the terminal. A very high degree of stable segregation between the two transmission paths is attainable, however, by frequency discrimination which is here discussed by way of illustration.

With reference first to Fig. 15, there is illustrated an arrangement wherein the sing-around circuit is intended to operate at a frequency low compared to the transmission frequency, while still sufficiently above the audio frequencies to be enabled to function as a carrier for the audio frequency. The order of magnitude of this carrier wave or sing-around frequency is indicated by the following. If the distance around the loop were of the order of 10 kilometers and the radio waves travel at the rate of some 300,000 kilometers per second, the waves will traverse the loop some 30,000 times per second. This sing-around frequency modulated upon the outgoing ultra-high radio frequency, indicated as carrier frequency 2, is transmitted as a double side band of the latter. The incoming transmission to the terminal would be a modulation of a second ultra-high radio frequency, indicated as a carrier frequency 1. This incoming transmission is detected, and there is taken from it as an intermediate frequency the sing-around frequency which is then fed back to the transmitting side of the terminal through the slope and limiter circuits.

In the arrangement of Fig. 14, the sing-around frequency is at the high transmission frequency itself, that is, the sing-around condition occurs at one or more of the harmonics of the fundamental of the round trip path, as determined by the speed of propagation and the length of the loop. The modulator shown in the outgoing or transmitting side of the circuit of Fig. 14 functions merely to offset in frequency the sing-around transmission from the incoming transmission, and the carrier frequency with which the outgoing modulator is supplied, indicated as $\Delta F$, is simply the difference in frequency between the two channels of transmission. The local turn-around circuit operates throughout at the high transmission frequency rather than at an intermediate frequency, and the terminal devices for modulation and detection for the two-way telephony would be designed accordingly.

Figure 16:
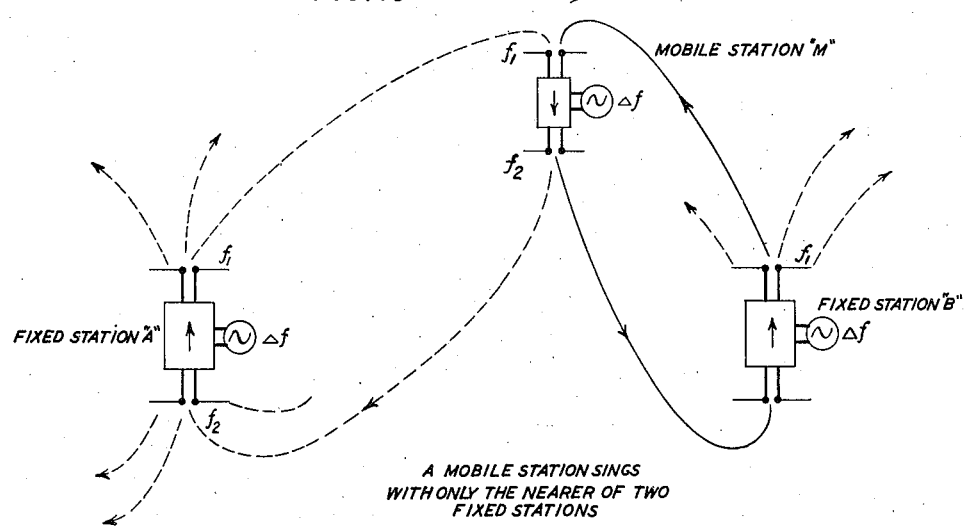
Fig. 16 illustrates the utilization of the loop-singing principle of the invention in a system involving fixed and mobile stations.

Fig. 16 illustrates how the invention may be applied to a system involving a plurality of fixed stations, of which two stations A and B are indicated, and a mobile station M. The stations are arranged so that the fixed stations transmit to the mobile station on the same band of frequencies, the mobile station transmitting to the fixed stations on another band of frequencies. A sing-around link between the mobile station and each fixed station may be established therefore without the fixed stations being able to establish a singing condition between themselves. When the mobile station is very much closer to one of the fixed stations than it is to the other, the mobile station will sing with the near fixed station only because of the very much lower attenuation in the one radio link as compared to the other. As the mobile station approaches a midway position between the two fixed stations, the two attenuations tend to become much the same, and there may be a brief period in which the mobile station tends to have a singing interlinkage with both of the fixed stations. The conditions, however, are changing rapidly at this point, and in a short time the singing path between the mobile station and the next fixed station will become controlling in view of the fact that the attenuation to the preceding station is increasing rapidly and that to the new station is correspondingly decreasing rapidly. Furthermore the high frequency energy carrying-capacity of the common amplifier at the mobile station is quickly occupied by one such sing thereby as rapidly excluding the other. A voltage limiter may be included in the mobile station to facilitate this excluding action to avoid overloading the amplifier. As the new path builds up and the distance of it decreases, that is, as the mobile station approaches the second fixed station, the gain of the mobile station amplifier will be reduced by virtue of automatic gain control whereby the feedback to the preceding station will become rapidly inconsequential. Each of the fixed stations, of course, may be associated with the same or a different telephone system, and the application of this arrangement for intercommunication between a mobile and a fixed station, to aircraft, land vehicles such as automobiles and railroad trains, and ships proceeding along a coast, will be evident. Thus this embodiment of the invention offers a solution to one of the difficult problems of a mobile system of communication involving a plurality of fixed stations, namely that of effecting automatic transfer of the mobile station between successive fixed stations without manually switching to different frequencies and without experiencing an extensive interference zone or "no man's land" in the area midway between two fixed stations.

Although this invention has been disclosed with reference to a number of specific arrangements it will be understood that they are illustrative of the invention and not a limitation thereon.

What is claimed is:

1. In a system comprising two high frequency stations, means for transmitting high frequency wave energy of one frequency band from one station, means for receiving said first station transmission at the second station, means for transmitting high frequency wave energy of a second frequency band from the second station, means for receiving said second station transmission at the first station, means at each station interconnecting the transmitting and receiving means thereat for amplifying the energy of the received transmission, translating the received transmission from one frequency band to the other in a single step of frequency translation and transferring the received transmission at its changed frequency to the transmitting means for amplified retransmission therefrom, the amplification introduced on successive round trip transmissions being sufficient to establish sustained oscillations around the loop comprising said stations and the intervening transmission medium, and a utilization circuit for said oscillations, said interconnecting means at one of said stations including a modulator with a beating oscillator connected thereto and frequency modulating means associated with said beating oscillator for continually changing the frequency of said beating oscillator and thereby changing the amount of said single step of frequency translation at the station of the received transmission at the station.

2. The method of communicating between two points remote from each other which comprises varying their spatial separation and during said variation transmitting electromagnetic wave energy from one of said points to the other, amplifying the wave energy at said other point and reflecting it back to said one point, amplifying said returned energy and retransmitting it to said other point, the amplification of the wave energy in its transmission around the circuit being of sufficient amount over a wide enough frequency band to sustain cyclic interaction between the two points, of periodicity varying during and in dependence upon the variation of the distance between the two points, for the range of the variation of spatial separation involved, and during the variation of spatial separation modulating said cyclic interaction of varying periodicity in accordance with signals to be communicated between the two points.

3. The method of indicating simultaneously at relatively moving points the distance between said points that comprises establishing in an electromagnetic wave energy transmission loop comprising said points and the transmission medium therebetween oscillations of frequencies constituting a series of harmonic frequencies of the varying fundamental natural frequency of the loop that are included in a given frequency range, the number of said harmonic frequencies in said given frequency range varying directly with the distance between said points, and measuring at each point the varying number of the oscillation frequencies at which such oscillations are generated in the given frequency range as the distance between the points varies.

4. The method of communication between two points remote from each other by carrier wave telephony which comprises producing self-sustaining oscillations around a high frequency energy transmission loop comprising said points and the transmission medium therebetween of frequency dependent on the energy propagation time around said loop, introducing time delay in the propagation of said oscillations around the loop, and modulating the frequency of the sing-around oscillations in accordance with telephonic signals to be transmitted between said points by varying the amount of said delay in accordance with the instantaneous magnitude of the signals.

5. A closed loop circuit comprising means at one point for transmitting electromagnetic wave energy from said one point to another point, means at said other point for receiving said energy from said one point, electromagnetic wave transmitting means at said other point for transmitting the received energy back to said one point, means at said one point for receiving said energy transmitted from said other point and supplying it to said first-mentioned means for retransmission to said other point, transducing means in said loop circuit having sufficient transmission gain to produce energy flow around said loop circuit of periodicity dependent upon the spatial separation of said points, and amplitude limiting means in said loop circuit for preventing overloading of said transducing means.

6. A radio transmission system comprising a plurality of fixed stations and a complementary mobile radio terminal, means included in each of said fixed stations for receiving electromagnetic wave energy in one frequency band, amplifying it, translating it to another frequency band and radiating it in said other band, means included in said mobile terminal for receiving said radiated energy in said other band, amplifying it, translating it to said one band and radiating it in said one band, the amount of the amplification of said energy in said stations and said terminal being such that oscillations of frequency dependent on the length of the oscillation path are established between the terminal and only the one of the stations that is nearest as the stations successively become nearest during movement of the terminal, and means for utilizing said oscillations.

7. A radio telephone system comprising a plurality of fixed stations and a complementary mobile radio terminal, means included in each of said fixed stations for receiving electromagnetic wave energy in one frequency band, amplifying it, translating it to another frequency band and radiating it in said other band, means included in said mobile terminal for receiving said radiated energy in said other band, amplifying it, translating it to said one band and radiating it in said one band, the amount of amplification of said energy in said stations and said terminal being such that oscillations of frequency dependent on the length of the oscillation path are established between the terminal and only the one of the stations that is nearest as the stations successively become nearest during movement of the terminal, means at the terminal and the stations for utilizing said oscillations as a carrier wave for two-way telephony between the terminal and the stations.

8. A carrier signaling system comprising two terminals remote from each other, a first wave transmission channel for transmitting a carrier wave from one of said terminals to the other, a second wave transmission channel for transmitting said carrier wave from said other terminal to said one terminal, a first interconnecting means at said one terminal for amplifying the carrier wave as received from the second channel and transmitting the amplified wave to the first channel, a second interconnecting means at said other terminal for amplifying the carrier wave as received from the first channel and transmitting the amplified wave to the second channel, the amount of amplification of said two interconnecting means being sufficient to generate sustained oscillations constituting said carrier wave around the carrier wave transmission loop formed by said channels and said means of frequency dependent on the time required for propagation of the carrier wave around the loop, means at each terminal for modulating the carrier wave in accordance with signals to be transmitted to the opposite terminal and detecting the signals transmitted from the opposite terminal, and frequency discriminative means in said interconnecting means at each terminal for preventing retransmission to the opposite terminal of signal sidebands of the carrier wave that are received therefrom.

9. A radio communication system comprising a mobile radio terminal movable along a course, and a succession of fixed radio stations so spaced along the course as to enable the mobile terminal at any point on the course to be within communication range of a fixed station, each fixed station comprising a radio receiver and a radio transmitter operating on different radio frequencies and means interconnecting the receiver and the transmitter, and the mobile terminal comprising a coacting radio receiver and radio transmitter and means interconnecting the receiver and the transmitter, said interconnecting means being adapted automatically to maintain a distance-depending sing-around connection of the mobile terminal with the nearest fixed station and to drop the connection while establishing one with the succeeding nearest fixed station without interference due to overlapping and without interrupting continuity of connection of the mobile terminal with the fixed stations.

10. A system comprising a mobile radio station movable along a route, a group of fixed radio stations disposed in succession along the route, each fixed station including a receiver for receiving waves of one frequency band and a transmitter for transmitting waves of a frequency band differing from said one band and thereby preventing interaction of said fixed stations, said mobile station including a transmitter and a receiver for correspondingly transmitting and receiving waves of said bands, each station, fixed and mobile, including a connection from the output of its receiver to the input of its transmitter, said connections adapting the stations to produce continuous self-sustained oscillations around a variable path that includes the mobile station and, as the mobile station proceeds along the course, includes each of the fixed stations as approached by the mobile station in turn and thereupon drops out the preceding fixed station so that automatically the mobile station has continuous unbroken two-way connection with the group of fixed stations but has connection with only one fixed station at a time, and means for utilizing the oscillations around the variable path as signal carrier oscillations for two-way carrier communication between the mobile station and the fixed stations.

11. The method of communicating between first and second radio stations that comprises varying their spatial separation and, during said variation, at said first station providing a first carrier wave and modulating it with a modulation wave to produce a first modulated carrier wave, transmitting said first modulated carrier wave to said second station and there deriving from it by demodulation a reproduction of said modulation wave, there providing a second carrier wave and modulating said second carrier wave with said derived wave to produce a second modulated carrier wave, transmitting said second modulated carrier wave to said first station and there deriving from it by demodulation said first-mentioned modulation wave, modulating the modulation wave at one of said stations with signals to be conveyed to the other station, and at said other station detecting said signals as the envelope of the modulation wave at that station.

12. In combination, a transmission channel for high frequency wave energy flow in one direction between two terminals remote from each other and at widely varying distance apart, a second transmission channel for high frequency wave energy flow in the opposite direction between said terminals, means at said terminals interconnecting the two channels and forming therewith a loop circuit for wave energy flow around said loop circuit comprising said channels and said means, amplifier means in said loop circuit with transmission gain sufficient to maintain singing around the entire loop circuit for the interterminal distance representing the maximum spatial separation between the terminals and with transmission frequency band width sufficient to accommodate widely different minimum and maximum sing frequencies corresponding to the maximum and minimum spatial separations of the terminals, at each of the terminals a delay network in said loop circuit, each of said delay networks having its transmission frequency band embrace the range of the variation of the sing frequency with the interterminal distance variation, said delay networks comprising sections of lattice configuration, each section having in its series arms reactances of a given sign and in its diagonal arms reactances of the opposite sign, at one of the terminals means responsive to signals to be transmitted from that terminal to the other for varying said reactances of at least one sign at said one terminal in accordance with variations in the instantaneous magnitude of the signals to modulate the varying sing frequency, at the other of the terminals means responsive to signals to be transmitted from said other terminal to said one terminal for varying said reactances of at least one sign at said other terminal in accordance with variations in the instantaneous magnitude of the latter signals to modulate the varying sing frequency, and at each of said terminals means for demodulating received frequency-modulated signals transmitted from the distant terminal.

13. A radio communication system comprising two radio terminals remote from each other, at least one of said terminals being mobile and the spatial separation of said terminals varying widely with time, a closed loop transmission path through said terminals and the transmission medium therebetween, wave amplifying means in said path having amplification at least as great as the attenuation of said path over a portion of the frequency spectrum adequate to enable said amplifying means to produce self-sustained oscillations around said loop path of frequency varying widely in response to variation of said spatial separation of said terminals, at each of said terminals a source of communication signals to be conveyed to the other terminal, modulating means in said loop path at each of said terminals, the modulating means at each terminal having its transmission frequency band width embrace the frequency range of variation of said oscillations and being responsive to the signals to be conveyed to the other terminal to modulate said self-sustained oscillations of varying frequency by the latter signals while the spatial separation of said terminals and the frequency of said oscillations vary widely, and means at each of the terminals for demodulating the modulated oscillations received from the other terminal and yielding their modulation signals.

LLOYD ESPENSCHIED.

REFERENCES CITED

The following references are of record in the file of this patent:

UNITED STATES PATENTS

| Number | Name | Date |
|---|---|---|
| 1,638,925 | Espenschied | Aug. 16, 1927 |
| 1,750,668 | Green | Mar. 18, 1930 |
| 1,771,148 | Sprague | July 22, 1930 |
| 1,945,952 | Nicholson | Feb. 6, 1934 |
| 2,134,716 | Gunn | Nov. 1, 1938 |
| 2,169,374 | Van Roberts | Aug. 15, 1939 |
| 2,301,929 | Budenbom | Nov. 17, 1942 |
| 2,333,688 | Shepard | Nov. 9, 1943 |
| 2,400,309 | Kock | May 14, 1946 |